Jan. 9, 1951
H. WAITT
2,537,561
MOUNTING MEANS FOR VARIABLE MAGNIFICATION OPTICAL SYSTEMS
Filed Oct. 22, 1948
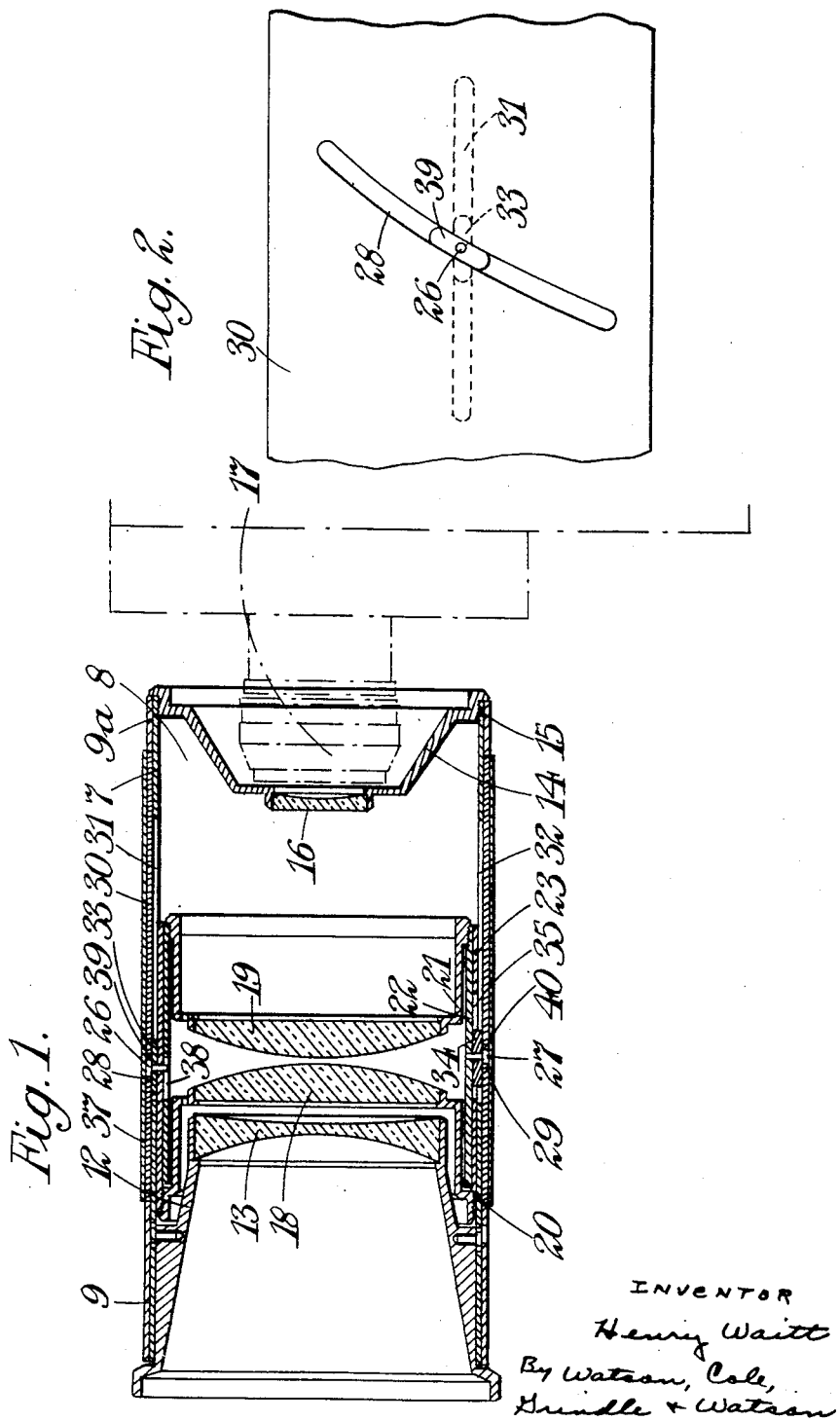
INVENTOR
Henry Waitt
By Watson, Cole,
Grindle & Watson Patented Jan. 9, 1951

2,537,561

UNITED STATES PATENT OFFICE 2,537,561

MOUNTING MEANS FOR VARIABLE MAGNIFICATION OPTICAL SYSTEMS

Henry Waitt, London, England, assignor to W. Watson & Sons Limited, London, England, a British company Application October 22, 1948, Serial No. 55,966
In Great Britain November 3, 1947

16 Claims. (Cl. 88—57)

This invention relates to means for causing relative axial movements of nested tubes and is particularly concerned with effecting relative axial movements of such tubes carrying lenses in an optical lens system.

It is already known to effect relative axial movements between a pair of nested tubes by means of a projection on one of the tubes passing through a longitudinally extending slot in the other, the slot limiting circumferential movement of the projection, and by means of a cam rotatable about the axis of the tubes and engaging the projection to impart axial movement thereto and hence to the tube attached thereto. This arrangement suffers from the disadvantage that the pressure applied to the projection introduces a couple which causes a tendency for the tubes to bind upon one another. It is further known to overcome or to reduce this disadvantage by providing two projections and co-operating cam means as aforesaid arranged at diametrically opposed positions, the two couples in this arrangement being in opposed directions and neutralising one another.

The present invention is concerned with a case in which it is desired to cause differential axial movements of two concentric tubes which are also to move axially with respect to a third concentric tube or equivalent support member and is based upon the appreciation that if two diametrically opposed projections arranged as aforesaid are provided on the two tubes to be moved respectively the combined movement of the tubes may be effected in relation to the support by cam means as aforesaid without introducing a binding couple or with only a minor couple and at the same time differential movement of the two tubes may be obtained by arranging the cam means to effect differential movement of the two projections.

In the preferred form of the invention the support member is in the form of a tube which may be concentric with the movable tubes and, conveniently is outside the movable tubes. The cam means may also comprise a further concentric tube which may be formed with two cam slots extending at constant or variable angles to the axis of the tubes and engaging the projections. The angles of the two slots are different and the angles and shapes of the slots may be chosen to provide relative movement between the movable tubes according to any desired law.

A specific embodiment of the invention will now be described by way of example and with reference to the accompanying drawings in which:

Figure 1 represents a sectional view of a variable magnification optical system attachment, as described in my copending Application No. 55,964, now Patent No. 2,501,219, dated March 21, 1950, for use with a cine camera the front portion of which is indicated by chain lines, and Figure 2 is a diagrammatic plan view of the attachment with the outer cover tube removed showing one set of the feathers and slots employed to move the lens-carrying tubes of the attachment.

The variable magnification attachment 8 comprises two fixed lenses 13 and 16, mounted in cells 12 and 14 carried on a body tube 7, and two movable lenses 18 and 19 which are moved axially according to a law which is determined by the optical requirements of the system. This law of movement requires that the lenses 18 and 19 be moved axially relative to the fixed lenses 13 and 16 and relative to each other. The lens 18 is mounted in a cell 20 carried by a tube 23 and the lens 19 is mounted in a cell 21 carried by a tube 22. The tube 22 slides within the tube 23 which in turn slides within the body tube 7. Two pins 26 and 27 extend radially outwards from the tubes 22 and 23 on opposite sides of their axis and have enlarged heads which carry feathers 39, 40 engaging respectively the sides of curved cam slots 28 and 29. The slots 28 and 29 are formed in the wall of an outer tube 30 which is carried on the body tube 7 between fixed rings 9, 9a which limits its axial movement, and is partially rotatable on the body tube about its axis. The lens carrying tubes 22 and 23 are prevented from rotating and are constrained for axial movement by means of two straight longitudinally extending slots 31 and 32 which are formed in the body tube 7, the sides of which slots engage feathers 33 and 34 carried on the pins 26 and 27 which pass respectively through the two longitudinally extending slots 31 and 32. The pin 27 also passes through, and the feather 34 lies partly within, a longitudinally extending clearance slot 35 which is formed in the outer movable lens carrying tube 23 and is sufficiently large not to restrict the movements of the pin 27 and the feather 34. A longitudinally extending clearance slot 38 is also provided in the inner movable lens carrying tube 22 to receive a projection through the inner surface of the tube 23 of the pin 26 without restricting the movement of the pin 26. The rotatable tube 30 is fitted with a cover tube 37, which encloses and protects the pins 26 and 27 the feathers 39 and 40 and the cam slots 28 and 29, and a radially extending handle, not shown, is attached to the outside of the rotatable tube

30, by means of screws which pass through the cover tube 37, to facilitate manual rotation of the tube 30.

The feathers 33, 34, 39, 40 consist of flat members which are rotatably carried on the pins 26 and 27 and each extends respectively along a short length of one of the slots and engages the sides thereof to facilitate movement of the pins by the sides of the slots.

The rear end of the body tube 7 extends beyond the rear fixed lens 16, and the cell 14 in which the said lens 16 is carried is of substantially conical shape so that the rear ends of the movable tubes 22 and 23 may slide, at the rearward limit of their travel, into the annular gap around the inwardly projecting part of the cell 14. The cell 21, in which the rear movable lens 19 is carried, is shaped so that the lens 19 is situated well within the tube 22 and thereby allows the tube 22 to move into the said annular gap. By similar means, the front ends of the movable tubes 22 and 23, at the forward limit of their travel, pass forward of the front fixed lens 13. These arrangements enable the lengths of the movable tubes 22 and 23 to be considerably greater than the distance between the movable lenses and it is found that by making the tubes 22 and 23 as long as possible the ease with which they are movable is increased.

In the operation of the attachment just described to vary the magnification of the lens system the cam tube 30 is rotated and by engagement of the slots 28, 29 with the pins 26, 27— through the feathers 39, 40—causes differential axial movement of the two tubes 22, 23 and associated lenses 18, 19, the movements being controlled by the shapes of the cam slots 28, 29 which are cut according to a law depending upon the lenses employed. The tubes 22, 23 or constrained for axial movement by the engagement of the feathers on the pins with the slots 31, 32 in the tube 7. It is found that with the arrangement described there is little or no tendency for the tube 23 to bind in the tube 7 as a result of the cam reaction.

I claim:

1. An optical system comprising two concentric relatively axially movable nested tubes, two lenses carried by the two tubes at opposite ends thereof respectively and on a common optical axis, a fixed support tube outside and concentric with the two movable tubes, two further lenses carried by the support tube on the aforesaid optical axis outside the first-mentioned lenses, a projection from one of the movable tubes extending in the radial direction through an axially extending slot in the wall of the other movable tube into co-operative guiding engagement with a guide slot in the support tube, a projection from the other movable tube at a position diametrically opposed to the first projection and extending in the radial direction into co-operative guiding engagement with a second guide slot in the support tube, the guide slots extending in the axial direction of the system and the engagement of the projections with the slots limiting circumferential movement of the projections and also comprising cam means rotatable as a unit about the axis of the systems and engageable with the two projections to effect, on rotation of the means, differential movements of the two projections and the tubes connected thereto in the axial direction.

2. An optical system as claimed in claim 1 in which the cam means comprise a further tube outside the support tube and having cam slots engaged by the projections.

3. An optical system as claimed in claim 2, in which the projections have guide feathers rotatable on the projections and providing bearing surfaces engaging the sides of the slots.

4. An optical system as claimed in claim 1 in which the several lenses are attached to their respective tubes by cells and the cells attached to the support tube are arranged to interfit into the cells carrying the adjacent movable lenses.

5. An optical system comprising three concentric nested tubes, the outermost tube of the three constituting a support tube and the other two tubes being movable axially relative to each other and relative to the support tube, two lenses carried by the two movable tubes respectively on a common optical axis, two further lenses carried by the support tube on the aforesaid optical axis outside the first-mentioned lenses, a projection extending radially outwards from the outer movable tube into co-operative guiding engagement with a guide slot in the support tube, an axially extending slot in the wall of the outer movable tube at a position diametrically opposed to said projection, a projection on the inner movable tube at a position diametrically opposed to the first projection and extending radially outwards through said slot in the wall of the outer movable tube into co-operative guiding engagement with a second guide slot in the support tube, the guide slots extending in the axial direction of the system and the engagement of the projections with the guide slots limiting circumferential movement of the projections, which system also comprises cam means rotatable as a unit about the axis of the system and comprising cams of different shapes engageable with the two projections respectively to effect, on rotation of the means, movements in the axial direction, relative to each other and relative to the support member, of the projections and, consequently, of the tubes connected thereto.

6. An optical system comprising three concentric nested tubes, the outermost tube of the three constituting a support tube and the other two tubes being movable axially relative to each other and relative to the support tube, two lenses carried by the two movable tubes at opposite ends thereof respectively and on a common optical axis, two further lenses carried by the support tube on the aforesaid optical axis outside the first-mentioned lenses, a projection extending radially outwards from the outer movable tube into co-operative guiding engagement with a guide slot in the support tube, an axially extending slot in the wall of the outer movable tube at a position diametrically opposed to said projection, a projection on the inner movable tube at a position diametrically opposed to the first projection and extending radially outwards through said slot in the wall of the outer movable tube into co-operative guiding engagement with a second guide slot in the support tube, the guide slots extending in the axial direction of the system and the engagement of the projections with the guide slots limiting circumferential movement of the projections, which system also comprises cam means rotatable as a unit about the axis of the system and comprising cams of different shapes engageable with the two projections respectively to effect, on rotation of the means, movements in the axial direction, relative to each other and relative to the support member, of the projections and, consequently, of the tubes connected thereto.

7. An optical system as claimed in claim 6 in which the several lenses are attached to their respective tubes by cells and the cells attached to the support tube are arranged to interfit into the cells carrying the adjacent movable lenses.

8. An optical system comprising two concentric relatively axially movable nested tubes, two lenses carried by the tubes respectively and on a common optical axis, a support member for the tubes, a projection from one of the tubes extending in the radial direction through an axially extending slot in the wall of the other tube into cooperative guiding engagement with a guideway in the support member, a projection from the other tube at a position diametrically opposed to the first projection and extending in the radial direction into cooperative guiding engagement with a second guideway in the support member, the guideways extending in the axial direction of the assembly and the engagement of the projections with the guideways limiting circumferential movement of the projections, and also comprising cam means rotatable as a unit about the axis of the assembly and engageable with the two projections to effect, on rotation of the means, differential movements of the two projections, the tubes connected thereto and the lenses carried by the tubes, in the axial direction.

9. An optical system comprising two concentric relatively axially movable nested tubes, two lenses carried by the tubes respectively and on a common optical axis, a support member, for supporting the tubes, positioned outside the tubes and permitting axial movement of the tubes relative to the support member, a projection extending in the radial direction outwards from the outer tube into a guideway in the support member, an aperture in the wall of said outer tube at a position diametrically opposed to said projection and extending in the axial direction of the system, a projection on the inner tube at a position diametrically opposed to the first projection and extending in the radial direction outwards through said aperture in the wall of the outer tube into a second guideway on the support member, the guideways in the support member extending in the axial direction of the system and the engagement of the projections with the guideways limiting circumferential movement of the projections, which system also comprises a cam means rotatable as a unit about the axis of the system and comprising cams of different shapes engageable with the two projections respectively to effect, on rotation of the means, movements in the axial direction relative to each other and relative to the support member, of the projections and, consequently, of the tubes connected thereto, and of the lenses carried by the tubes.

10. An optical system comprising two concentric relatively axially movable nested tubes, two lenses carried by the tubes respectively and on a common optical axis, a support member, for supporting the tubes, positioned outside the tubes and permitting axial movement of the tubes relative to the support member, a projection extending in the radial direction outwards from the outer tube into a guideway in the support member, an aperture in the wall of said outer tube at a position diametrically opposed to said projection and extending in the axial direction of the system, a projection on the inner tube at a position diametrically opposed to the first projection and extending in the radial direction outwards through said aperture in the wall of the outer tube into a second guideway on the support member, the guideways in the support member extending in the axial direction of the system and the engagement of the projections with the guideways limiting circumferential movement of the projections, which system also comprises cam means, rotatable as a unit about the axis of the system and comprising two cams having respectively portions of different slope engageable simultaneously with the two projections respectively to effect, on rotation of the means, movements in the axial direction, relative to each other and relative to the support member, of the projections and, consequently, of the tubes connected thereto, and of the lenses carried by the tubes.

11. An optical system comprising two concentric relatively axially movable nested tubes, two lenses carried by the tubes respectively and on a common optical axis, a support member for supporting the tubes and permitting axial movement of the tubes relative to the support member, a projection extending in the radial direction from one of the tubes into a guideway in the support member, an aperture in the wall of said tube at a position diametrically opposed to said projection and extending in the axial direction of the system, a projection on the other tube at a position diametrically opposed to the first projection and extending through the aperture into a second guideway on the support member, the guideways in the support member extending in the axial direction of the system and the engagement of the projections with the guideways limiting circumferential movement of the projections, which system also comprises cam means rotatable as a unit about the axis of the system and comprising cams of different shapes engageable with the two projections respectively to effect, on rotation of the means, movements in the axial direction relative to each other and relative to the support member, of the projections and, consequently, of the tubes connected thereto, and of the lenses carried by the tubes.

12. An optical system comprising two concentric relatively axially movable nested tubes, two lenses carried by the tubes respectively and on a common optical axis, a support member for supporting the tubes and permitting axial movement of the tubes relative to the support member, a projection extending in the radial direction from one of the tubes into a guideway in the support member, an aperture in the wall of said tube at a position diametrically opposed to said projection and extending in the axial direction of the system, a projection on the other tube at a position diametrically opposed to the first projection and extending through the aperture into a second guideway on the support member, the guideways in the support member extending in the axial direction of the system and the engagemet of the projections with the guideways limiting circumferential movement of the projections, which system also comprises cam means, rotatable as a unit about the axis of the system and comprising two cams having respectively portions of different slope engageable simultaneously with the two projections respectively to effect, on rotation of the means, movements in the axial direction, relative to each other and relative to the support member, of the projections and, consequently, of the tubes connected thereto, and of the lenses carried by the tubes.

13. An optical system comprising three concentric nested tubes, the outermost tube of the three constituting a support tube and the other two tubes being movable axially relative to each other and relative to the support tube, two lenses carried by the movable tubes respectively and on a common optical axis, a projection extending radially outwards from the outer movable tube into cooperative guiding engagement with a guide slot in the support tube, an axially extending slot in the wall of the outer movable tube at a position diametrically opposed to said projection, a projection on the inner movable tube at a position diametrically opposed to the first projection and extending radially outwards through said slot in the wall of the outer movable tube into cooperative guiding engagement with a second guide slot in the support tube, the guide slots extending in the axial direction of the system and the engagement of the projections with the guide slots limiting circumferential movement of the projections, which system also comprises cam means rotatable as a unit about the axis of the system and comprising cams of different shapes engageable with the two projections respectively to effect, on rotation of the means, movements in the axial direction, relative to each other and relative to the support member, of the projections and, consequently, of the tubes connected thereto, and of the lenses carried by the movable tubes.

14. An optical system comprising three concentric nested tubes, the outermost tube of the three constituting a support tube and the other two tubes being movable axially relative to each other and relative to the support tube, two lenses carried by the movable tubes respectively and on a common optical axis, a projection extending radially outwards from the outer movable tube into cooperative guiding engagement with a guide slot in the support tube, an axially extending slot in the wall of the outer movable tube at a position diametrically opposed to said projection, a projection on the inner movable tube at a position diametrically opposed to the first projection and extending radially outwards through said slot in the wall of the outer movable tube into cooperative guiding engagement with a second guide slot in the support tube, the guide slots extending in the axial direction of the system and the engagement of the projections with the guide slots limiting circumferential movement of the projections, which system also comprises cam means, rotatable as a unit about the axis of the system and comprising two cams having respectively portions of different slope engageable simultaneously with the two projections respectively to effect, on rotation of the means, movements in the axial direction, relative to each other and relative to the support member, of the projections and, consequently, of the tubes connected thereto, and of the lenses carried by the movable tubes.

15. An optical system as claimed in claim 14 in which the cam means comprise a further tube outside the support tube and having cam slots engaged by the projections.

16. An assembly as claimed in claim 15 in which the projections have guide feathers rotatable on the projections and providing bearing surfaces engaging the sides of the slots.

HENRY WAITT.

REFERENCES CITED

The following references are of record in the file of this patent:

UNITED STATES PATENTS

| Number | Name | Date |
| --- | --- | --- |
| 212,099 | Knapp | Feb. 11, 1879 |
| 696,788 | Allen | Apr. 1, 1902 |
| 1,768,315 | Goldhammer | June 24, 1930 |
| 1,795,747 | Viken | Mar. 10, 1931 |
| 1,922,537 | Fouguet | Aug. 15, 1933 |
| 1,966,566 | Spica | July 17, 1934 |
| 1,988,390 | Naumann | Jan. 15, 1935 |
| 2,026,724 | Wollensak | Jan. 7, 1936 |
| 2,128,365 | Killman et al. | Aug. 30, 1938 |
| 2,235,364 | Gramatzki | Mar. 18, 1941 |